Figure 1:
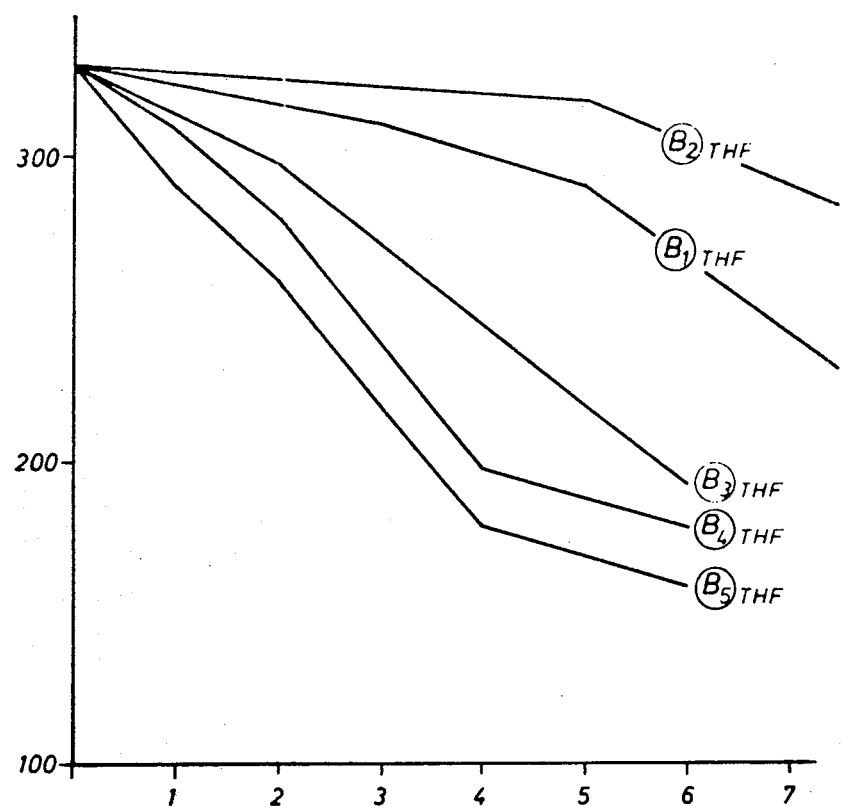

United States Patent [19]

Lindner et al.

[11] 4,151,228
[45] Apr. 24, 1979

[54] ACRYLONITRILE POLYMER BLENDED WITH A STATISTICAL COPOLYMER OF ACRYLIC ACID ALKYL ESTER AND STYRENE

[75] Inventors: Christian Lindner, Cologne; Siegfried Korte; Aziz El Sayed, both of Leverkusen; Carlhans Suling, Odenthal, all of Fed. Rep. of Germany

[73] Assignee: Bayer Aktiengesellschaft, Leverkusen, Fed. Rep. of Germany

[21] Appl. No.: 773,392

[22] Filed: Mar. 2, 1977

[30] Foreign Application Priority Data

Mar. 4, 1976 [DE] Fed. Rep. of Germany ....... 2608878

[51] Int. Cl.$^2$ ............................................. C08L 33/00
[52] U.S. Cl. .............................. 260/898; 260/876 R;
260/888; 260/891; 260/901
[58] Field of Search ......................... 260/898, 876 R

[56] References Cited

U.S. PATENT DOCUMENTS

| | | | |
|---|---|---|---|
| 2,850,478 | 9/1958 | Coover et al. | 260/45.5 |
| 3,058,949 | 10/1962 | Coover et al. | 260/45.5 |
| 3,763,121 | 10/1973 | Schnalke et al. | 260/80.81 |
| 3,914,337 | 10/1975 | Giddings et al. | 260/876 R |
| 3,931,074 | 1/1976 | Gomez | 260/23 R |
| 3,984,601 | 10/1976 | Blickenstaff | 428/364 |

FOREIGN PATENT DOCUMENTS 2160518  8/1972  Fed. Rep. of Germany.
1366431  9/1974  United Kingdom.
1376134  12/1974  United Kingdom.

*Primary Examiner*—Richard B. Turer
*Attorney, Agent, or Firm*—Connolly and Hutz

[57] ABSTRACT

A thermoplastic moulding composition with improved flow properties being workable without difficulty by extrusion, injection moulding or blow moulding and resulting in colorless, transparent products with a smooth, glossy surface, comprising a mixture of (A)

90 to 99.9% by weight of a polymer with a K-value of from 50 to 80, as measured at a temperature of 25° C. in dimethyl formamide on a 0.5% by weight solution, which contains at least 50% by weight of acrylonitrile or methacrylonitrile or a mixture thereof in polymerized or grafted form, and (B)

0.1 to 10% by weight of a statistical copolymer of copolymerized units of 65 to 85% by weight of at least one acrylic acid alkyl ester with 1 to 8 carbon atoms in the alcohol component, and 15 to 35% by weight of styrene, the copolymer B having an intrinsic viscosity [$\eta$] of from 2.9 to 13.0 dl/g, as measured at 25° C. in tetrahydrofuran.

4 Claims, 3 Drawing Figures

ACRYLONITRILE POLYMER BLENDED WITH A STATISTICAL COPOLYMER OF ACRYLIC ACID ALKYL ESTER AND STYRENE

This invention relates to thermoplastic moulding compositions with improved flow properties comprising mixtures of polymers, which contain at least 50% by weight of (meth) acrylonitrile in polymerised form or in grafted form, and special copolymers of copolymerised units of styrene and acrylic acid esters.

It is known that transparent thermoplastic moulding compositions containing large amounts of copolymerised acrylonitrile can be used as a starting material for shaped articles such as, for example, films or bottle-like hollow bodies.

The thermoplastic processing of acrylonitrile copolymers containing more than 50% by weight of copolymerised acrylonitrile is attended by the disadvantage that, on account of their inadequate flow properties, these copolymers are difficult to process by the conventional techniques of extrusion, injection moulding or blow moulding.

Especially good flow properties are particularly necessary in cases where it is intended to obtain improved mechanical properties of the mouldings by special processing techniques in which forming is coupled with a stretching process.

It is also known that the forming properties of polyacrylonitrile or acrylonitrile copolymers can be improved by the presence of activating plasticisers during the forming process. One example of a plasticiser is water, as described in German Offenlegungsschrift No. 2,248,244. Other plasticisers are, for example, the esters of long-chain aliphatic alcohols with citric acid, stearic acid or phthalic acid, as described in German Offenlegungsschrift No. 2,207,705.

One disadvantage of the process according to German Offenlegungsschrift No. 2,248,244 where water is used as a plasticiser during forming is that forming has to be carried out in special units in which pressure can only be equalised under very special conditions because otherwise bubbles are formed in the articles. Another disadvantage is that, in the procedure adopted for this process, it is only possible to obtain filaments, but not hollow bodies, by the blow forming technique.

The disadvantages of the process according to German Offenlegungsschrift No. 2,207,705 is that the plasticiser has to be used in relatively large quantities to obtain a significant technical effect. Although this process does give an improvement in impact strength, it has very little influence upon the forming properties. Furthermore, in cases where low molecular weight plasticisers are used in relatively large quantities, the plasticisers are inevitably extractable from the mouldings with the result that corresponding articles cannot be used as packaging materials for foodstuffs.

It is also known that the properties of thermoplastic materials can be improved by adding high molecular weight compounds to the melt during working up of the polymer. For example, it is disclosed in German Offenlegungsschrift No. 2,160,518 that the properties of mouldings of thermoplastic formable acrylonitrile polymers can be improved by adding other polymers, such as, for example, polypropylene or polyformaldehyde, to these copolymers in such a way that mouldings with improved properties, especially in regard to shrinkage, are obtained after processing. The process according to German Offenlegungsschrift No. 2,160,518 is designed to improved the properties of shaped articles such as, for example, filaments and fibres. Large-surface mouldings cannot be obtained by conventional thermoplastic processing techniques in cases where the above-mentioned additives are used. Attempts to process mixtures of the above-mentioned products, for example by a blow forming process, produce mouldings with inadequate transparency and an unsatisfactory surface on account of disintegration and incompatibility phenomena.

An object of the present invention is to provide thermoplastic moulding compositions based on (meth)acrylonitrile polymers wherein the compositions have improved flow properties under forming conditions and may be processed without difficulty by conventional thermoplastic processing techniques, such as extrusion, injection moulding or blow moulding. The resulting mouldings are intended to be free from disintegration and incompatibility phenomena and to give colourless, transparent products with a smooth, glossy surface.

According to the invention, this object is achieved by mixing polymers with K-values of from 50 to 80, which contain at least 50% by weight of (meth)acrylonitrile in polymerised form or grafted form, with special styrene/acrylic acid ester copolymers. It was surprising and by no means foreseeable that only styrene/acrylic acid ester copolymers within a limited molecular weight range, corresponding to a certain intrinsic viscosity range, effectively improve the flow properties. It is particularly surprising that this effect is greater, the higher the molecular weight within the molecular weight range specified. On the contrary, it had been expected that the improvement in the flow properties would be greater, the lower the molecular weight of the additive.

Accordingly, the present invention provides thermoplastic moulding compositions with improved flow properties comprising a mixture of (A)

90 to 99.9% by weight of a polymer with K-values of from 50 to 80, as measured at 25° C. on 0.5% by weight solutions in dimethyl formamide, which contains at least 50% by weight of acrylonitrile or methacrylonitrile or mixtures thereof in polymerised form or in grafted form, and (B)

0.1 to 10% by weight of a statistical copolymer of copolymerised units of 65 to 85% by weight of at least one acrylic acid alkyl ester containing from 1 to 8 carbon atoms in the alcohol component, and 15 to 35% by weight of styrene, copolymer B having intrinsic viscosities $[\eta]$ of from 2.9 to 13.0 dl/g, as measured at 25° C. in tetrahydrofuran.

The mixtures according to the invention preferably contain from 94 to 99.9% by weight of component A and from 0.1 to 6% by weight of component B.

In the context of the invention, polymers (=component A) are understood to be graft polymers, homopolymers or copolymers, but preferably copolymers which contain the monomers copolymerised in statistical distribution. The polymers contain at least 50% by weight of acrylonitrile and/or methacrylonitrile in polymerised form and have K-values of from 50 to 80. The K-value of the polymers is their internal viscosity (cf. Methoden der Organischen Chemie, Houben-Weyl (1961), Vol. 14/1, page 83).

The graft polymers which may be used as component A generally contain from 5 to 20% by weight of a graft substrate based on synthetic and/or natural rubber components, such as polybutadiene, polyisoprene, poly-2-chlorobutadiene, acrylic acid ester/butadiene copolymers, acrylonitrile/butadiene copolymers or ethylene/propylene copolymers. In addition, the graft polymers contain from 50 to 80% by weight of acrylonitrile and/or methacrylonitrile and, optionally, up to 45% by weight of α-olefins with 3 to 5 carbon atoms, acrylic or methacrylic acid alkyl esters with 1 to 4 carbon atoms in the alcohol component, styrene, vinyl esters of aliphatic, saturated $C_2$-$C_3$-carboxylic acids or mixtures of the above-mentioned monomers in grafted form. Acrylonitrile, propylene, methyl acrylate and ethyl acrylate are preferred.

Graft polymers of the above-mentioned type are known and are described, for example, in US-PS No. 3,426,102; DOS No. 2,511,106 and DOS No. 2,362,418.

Polyacrylonitrile may be used as homopolymer.

In the context of the invention, preferred polymers (=component A) are statistical copolymers. These copolymers, which have K-values of from 50 to 80, generally contain copolymerized units of 50 to 85% by weight of acrylonitrile, methacrylonitrile or mixtures thereof, and 15 to 30% by weight of α-olefins with 3 to 5 carbon atoms, acrylic acid or methacrylic acid alkyl esters with 1 to 4 carbon atoms in the alcohol component, styrene, vinyl esters of aliphatic saturated $C_2$-$C_3$-carboxylic acids or mixtures of the above-mentioned monomers.

Particularly preferred copolymers consist of copolymerised units of 50 to 85% by weight of acrylonitrile, 10 to 30% by weight of vinyl acetate, and 5 to 20% by weight of styrene.

Component B of the mixtures according to the invention, which produces the improvement in the flow properties of polymer A, is a copolymer which contains in statistical distribution copolymerised units of 65 to 85% by weight, preferably 70 to 80% by weight, of acrylic acid alkyl esters with 1 to 8 carbon atoms, preferably with 4 to 8 carbon atoms, in the alcohol component, and 15 to 35% by weight, preferably 20 to 30% by weight, of styrene.

Of the acrylic acid alkylesters, acrylic acid-n-butyl ester is particularly preferred.

Component B of the mixtures according to the invention must have intrinsic viscosities [η] of from 2.9 to 13.0, preferably from 5 to 13, dl/g, as measured at 25° C. in tetrahydrofuran.

The statistical copolymers of components A and B may be obtained by known polymerisation processes such as those described, for example, in Methoden der Organischen Chemie, Houben-Weyl (1961), Vol. 14/1, pages 33–1078.

The mixtures according to the invention may be produced by conventional methods. Thus, it is possible to prepare solutions of components A and B, to mix these solutions with one another and to remove the solvent in suitable apparatus, such as evaporator screws, or to precipitate the polymers together from the solution of components A and B. In addition, the polymers may be mixed in molten form in an extruder. In one preferred embodiment of the mixing process, the polymers produced by emulsion polymerisation, i.e. obtained in latex form, are mixed with one another and the resulting latex mixture is co-precipitated by conventional coagulation reagents.

The mixtures according to the invention may be processed without difficulty by conventional thermoplastic processing techniques, such as extrusion, injection moulding, calendering or blow forming, to form sheets, profiles, housings, bottles, films or other articles. Component B distinctly reduces the melt viscosity of component A so that the mixtures may be extruded at low temperatures, i.e. under less rigorous conditions, whereby mouldings with a considerably improved natural colour may be produced.

Extruded materials made from mixtures according to the invention of nitrile resin/acrylic acid alkyl ester/styrene copolymer are colourless transparent products providing the components are compatible with one another or the refractive indices $n_D$ of the nitrile resin and the polymeric additive differ only slightly from one another, if possible by no more than one $\Delta n_D$ unit of 0.01. This optical requirement for the production of transparent materials of polymer mixture is satisfied by the polymers specified in the Examples.

The reduced melt viscosity of the mixtures provides for easier and more uniform plasticisation. Additives, such as stabilisers for example, can be worked in more quickly and hence become active more quickly. The mixtures according to the invention may be processed into homogeneous mouldings which, in addition to favourable mechanical values, have a smooth glossy surface.

If desired, soluble dyes, pigments and/or fillers may be introduced into the mixtures according to the invention.

The parts quoted in the following formulations and Examples are parts by weight, unless otherwise indicated.

The intrinsic viscosities [η] quoted were measured in tetrahydrofuran (THF) or in dimethyl formamide (DMF) at 25° C. and are expressed in dl/g.

The K-values quoted were measured at 25° C. on 0.5% by weight solutions of the polymer in dimethyl formamide. The melt viscosities, expressed in poises, were measured in accordance with DIN 53 735 at 210° C. with a standard 2.1 mm nozzle and with an L/D ratio of 4 for a shear gradient of $2.10^6$ dyn/cm$^2$.

Production of the Starting Materials

Polymer components (A)

A thermoplastically formable nitrile resin was produced by continuous emulsion polymerisation. The following solutions I, II and III were used:

| Solution I | |
|---|---|
| deionised water | 1000 parts |
| potassium persulphate | 1.55 parts |
| sulphuric acid (1-normal) | 34 parts |
| disodium salt of ethylene diamine tetra-acetic acid (0.2% by weight in water) | 5 parts |

| Solution II | |
|---|---|
| deionised water | 1000 parts |
| sodium pyrosulphite | 9.3 parts |
| sodium lauryl sulphate (30% by weight | |

| Solution II | |
|---|---|
| in water) | 34.0 parts |

| Solution III | |
|---|---|
| acrylonitrile | 600 parts |
| vinyl acetate | 300 parts |
| styrene | 100 parts |
| n-octyl mercaptan | 3.5 parts |

Solutions I to III are simultaneously introduced with stirring in the following quantitative ratio into a reaction vessel maintained at a temperature of 53° C.:
 Solution I: 100 parts per hour
 Solution II: 100 parts per hour
 Solution III: 50 parts per hour After 1.5 hours, i.e. with the reaction volume now constant, a quantity of latex corresponding to inputs I to III is continuously discharged by opening an overflow (residence time: 1.5 hours).

At a conversion of 75%, a 15% by weight emulsion is obtained following separation of the residual monomers in a degassing apparatus. A statistical copolymer $A_1$ with the following properties is isolated from this emulsion:
 Composition:
 Copolymerised units of
 64% by weight of acrylonitrile
 22% by weight of vinyl acetate, and
 14% by weight of styrene
 K-value:
 61.0 $[\eta]_{DMF} = 0.8$ dl/g
 Melt viscosity: $230.10^3$ poises.

In addition, the following polymers were used as component A:
 Statistical copolymer $A_2$ with copolymerised units of:
 67% by weight of acrylonitrile,
 25% by weight of vinyl acetate, and
 8% by weight of propylene
produced in accordance with DT-AS 2,119,213 with a K-value of 55 and a melt viscosity of $150.10^3$ poises.
 Statistical copolymer $A_3$ with copolymerised units of:
 73% by weight of acrylonitrile and
 27% by weight of methyl acrylate,
produced in accordance with DT-OS 2,247,332 with a K-value of 60 and a melt viscosity of $220.10^3$ poises. Graft copolymer $A_4$ produced in accordance with US-PS 3,426,102 and consisting of
 (a) 10% by weight of a graft substrate of an acrylonitrile/butadiene copolymer with copolymerised units of 25% by weight of acrylonitrile and 75% by weight of butadiene, and
 (b) 90% by weight of grafted-on units of 66% by weight of acrylonitrile and 24% by weight of methyl acrylate.
The graft polymer has a melt viscosity of $272.10^3$ poises.

Production of the Starting Materials

Copolymer components (B)

(1) A mixture of 5000 parts of water, 5 parts of 1 N-sulphuric acid, 6 parts of sodium lauryl sulphate, 166 parts of acrylic acid-n-butyl ester and 34 parts of styrene is heated to 50° C. and polymerised by the addition of the following solutions:

(a)
 0.3 parts of potassium persulphate
 20 parts of water (b)
 1.8 parts of sodium pyrosulphite
 20 parts of water After a reaction time of 10 minutes, the following solutions are continuously added over a period of 4 hours:

Solution I:
 1.8 parts of potassium persulphate
 1.5 parts of a 0.2% aqueous solution of the disodium salt of ethylene diamine tetraacetic acid
 40 parts of 1 N-sulphuric acid
 200 parts of water Solution II:
 18 parts of sodium pyrosulphite
 200 parts of water Solution III:
 22 parts of sodium lauryl sulphate
 250 parts of water Solution IV:
 768 parts of acrylic acid-n-butyl ester.

The latex thus obtained is freed from the unreacted monomer. The statistical copolymer $B_1$ formed in a yield of 90% contains copolymerised units of 27% by weight of styrene and 73% by weight of n-butyl acrylate and has an intrinsic viscosity, as measured in tetrahydrofuran, $[\eta]_{THF}$ of 4.53 dl/g.

Using the same formulation, but with a slightly increased quantity of initiator, a statistical copolymer $B_2$ with substantially the same composition, but with an intrinsic viscosity $[\eta]_{THF}$ of 1.95 dl/g, is obtained and is used for comparison purposes.

(2) A mixture of 5000 parts of water, 5 parts of 1 N-sulphuric acid, 21 parts of sodium lauryl sulphate, 166 parts of acrylic acid-n-butyl ester and 34 parts of styrene is heated to 50° C. and polymerised by addition of the following solutions:

(a)
 0.2 part of potassium persulphate
 20 parts of water (b)
 0.8 part of sodium pyrosulphite
 20 parts of water After a reaction time of 10 minutes, the following solutions are continuously added over a period of 4 hours:

Solution I:
 1.3 parts of potassium persulphate
 1.5 parts of a 0.2% aqueous solution of the disodium salt of ethylene diamine tetraacetic acid
 40 parts of 1 N-sulphuric acid
 200 parts of water Solution II:
 5.5 parts of sodium pyrosulphite
 200 parts of water

Solution III:

7 parts of sodium lauryl sulphate
215 parts of water

Solution IV:

768 parts of acrylic acid-n-butyl ester
432 parts of styrene

The latex thus obtained is freed from unreacted monomers. The statistical copolymer (B₃) formed in a yield of 86% contains copolymerised units of 28% by weight of styrene and 72% by weight of n-butyl acrylate and has an intrinsic viscosity, as measured in tetrahydrofuran, $[\eta]_{THF}$ of 7.3 dl/g.

Using the same formulation, but with a slightly reduced quantity of initiator and without the disodium salt of ethylene diamine tetraacetic acid, a statistical copolymer (B₄) with substantially the same composition is obtained. It has an intrinsic viscosity $[\eta]_{THF}$ of 8.26 dl/g.

(3) A mixture of 5000 parts of water, 5 parts of 1 N-sulphuric acid, 21 parts of sodium lauryl sulphate, 166 parts of acrylic acid-n-butyl ester and 34 parts of styrene, is heated to 50° C. and copolymerised by addition of the following solutions:

(a)

0.2 part of potassium persulphate
20 parts of water (b)

0.4 part of sodium pyrosulphite
20 parts of water

After a reaction time of 10 minutes, the following solutions are continuously added over a period of 4 hours:

Solution I:

0.4 part of potassium persulphate
40 parts of 1 N-sulphuric acid
200 parts of water

Solution III:

3 parts of sodium pyrosulphite
200 parts of water

Solution III:

7 parts of sodium lauryl sulphate
215 parts of water

Solution IV:

768 parts of acrylic acid-n-butyl ester
432 parts of styrene

The latex obtained is freed from unreacted monomers. The statistical copolymer (B₅) formed in a yield of 69% contains copolymerised units of 26% by weight of styrene and 71% by weight of n-butyl acrylate and has an intrinsic viscosity, as measured in tetrahydrofuran, $[\eta]_{THF}$ of 10.8 dl/g.

Production of the mixtures according to the invention

The latices of the polymer components A and the copolymer components B are mixed together, according to the required mixing ratio of the latex solids contents, and diluted with twice the quantity by volume of water. The latex mixture is coagulated by addition of the same quantity by volume, based on the total quantity of dilute latex mixture, of 1% aluminum sulphate solution. After the coagulated latex mixture has been heated to 70° C. and cooled to room temperature, the polymer mixture is filtered off, washed free of emulsifier and dried.

EXAMPLE 1

Table 1 below compares the melt viscosity of polymer component (A₁) with the melt viscosities of mixtures according to the invention of 96% by weight of polymer component (A₁) and 4% by weight, of copolymer component (B₁) or (B₄). The influence of the additives (B₁) and B₄ upon the melt viscosity of (A₁) is clearly apparent. It is particularly surprising that the higher molecular weight additive (B₄) reduces the melt viscosity of (A₁) to a greater extent than the additive (B₁).

Table 1

| | Melt viscosity (poises) |
|---|---|
| Polymer component (A₁) | 230 . 10³ |
| 96 % by weight of polymer component (A₁) | 142 . 10³ |
| 4% by weight of copolymer component (B₁) | |
| 96% by weight of polymer component A₁ | 28 . 10³ |
| 4% by weight of copolymer component (B₄) | |

In addition, tests with mixtures according to the invention and with a comparison mixture was carried out in a Brabender Plastograph. 60 g batches of the mixtures according to the invention were treated for 20 minutes at 180° C. in the Brabender Plastograph at a rotational speed of 50 rpm. The mixtures contained polymer component (A₁) and up to 7.5% by weight, based on the mixture, of copolymer components (B₁),(B₃),(B₄) and (B₅) and, for comparison (B₂). FIG. 1 shows the results. The percentage contents (% by weight) of the copolymer components (B₁) to (B₅) are recorded on the abscissa of the graph and the torques in kpm (100–330 kpm) on the ordinate. The straight-line curves indicate the particular torque in dependence upon the percentage addition of components B, the letters accompanying the curves designating the copolymer component used. The graph shows that the torque decreases with increasing addition and, surprisingly, with increasing molecular weight (=increasing intrinsic viscosity) of the chemically substantially identical copolymer; in other words processing is easier. It can also be seen that the comparison mixture, which contains copolymer component (B₂) $[\eta] = 1.95$ dl/g, is only slightly influenced.

EXAMPLE 2

The polymer mixture with copolymer component (B₄) treated in the Brabender Plastograph (see FIG. 1) was measured for discoloration: the colour difference E of a 5% solution of the mixture in dimethyl formamide was determined in the wavelength range of from 380 to 700 nm against pure dimethyl formamide (5 mm cuvette with polymer solution against 5 mm cuvette with pure dimethyl formamide).

Figure 2:
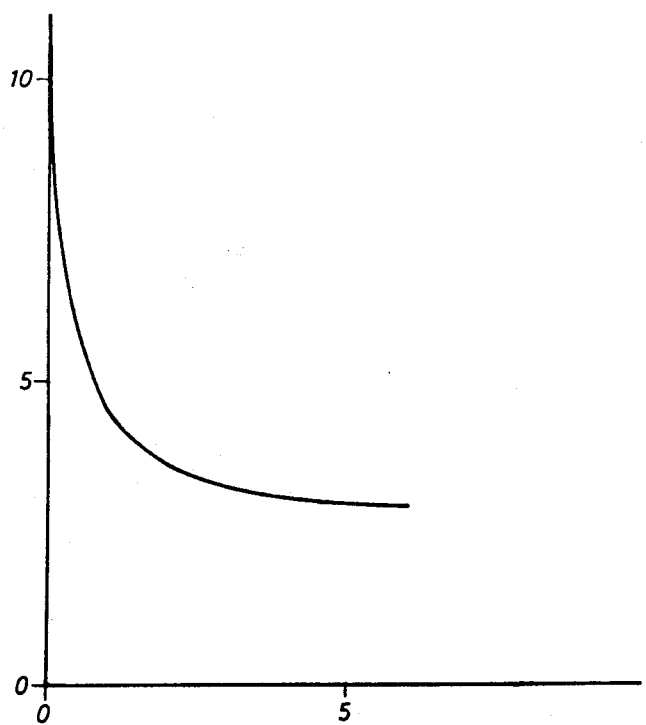

FIG. 2 shows how the discoloration of the nitrile resin treated in the Brabender Plastograph is reduced in the mixture according to the invention because the molecular changes responsible for discoloration are avoided through the better flow of the melt.

In the graph of FIG. 2, the percentage content (% by weight) of copolymer component $B_4$ is recorded on the abscissa and the colour difference $\Delta E$ (0 to 10.35) on the ordinate.

EXAMPLE 3

The output/back pressure curves of a mixture according to the invention of polymer component $A_1$ and 0.1% by weight, 0.4% by weight, 1% by weight and 4% by weight, based on mixture, of copolymer $B_1$ ($[\eta]=4.53$ dl/g), are measured in a Dreisig-Extrusiometer (Gottferd), screw compression 1:25, nozzle: 3 mm, screw temperature: 150, 170, 180, 190° C.

Figure 3:
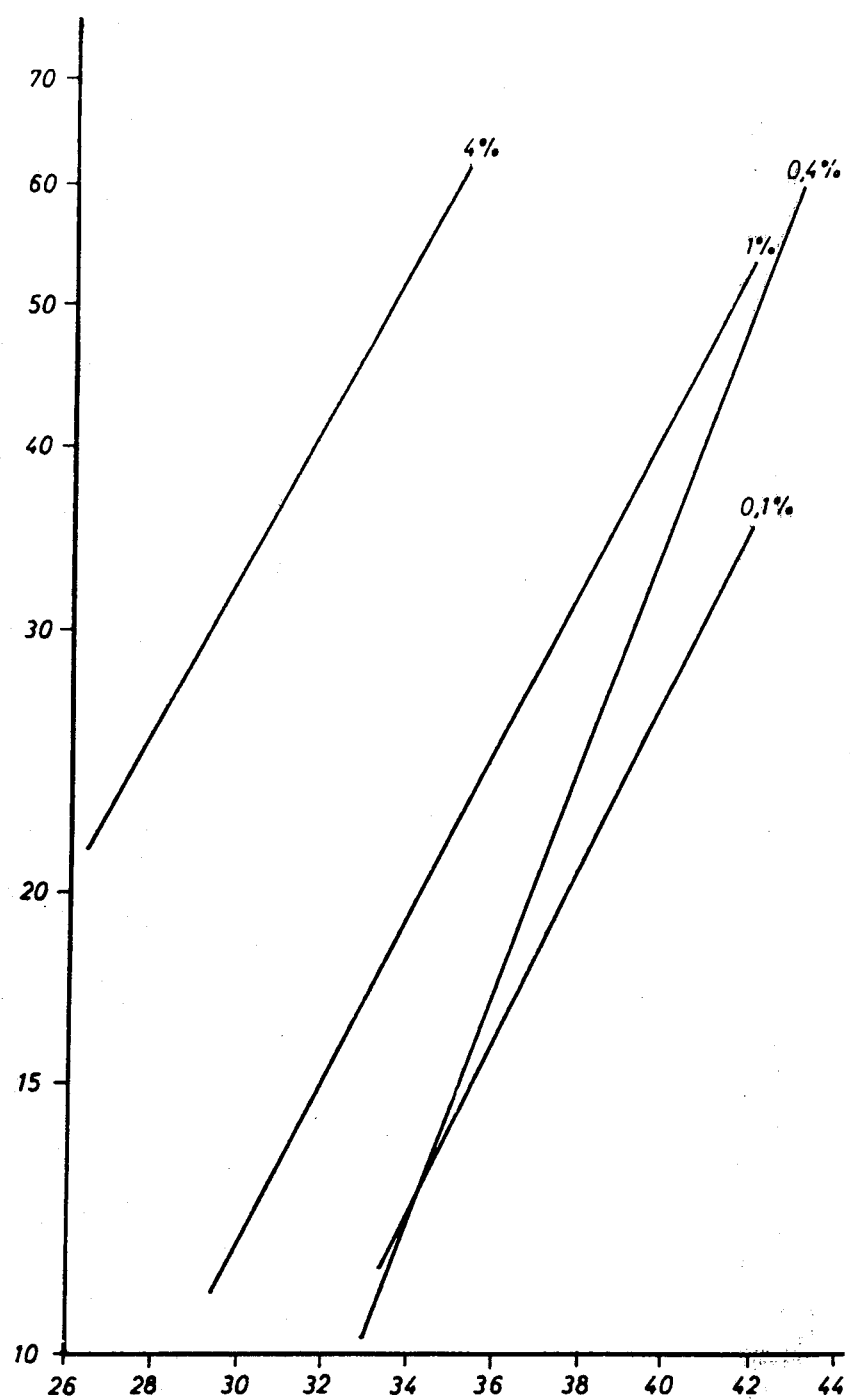

In the graph of FIG. 3, the back pressure [MPa](- =MegaPascal) is recorded on the abscissa and the output in g/min (10–70) on the ordinate. It can be seen that for a constant output of the extruder, the back pressure generated in the extruder is lower when the content of copolymer $B_1$ is increased. The magnitude of the back pressure in the extruder for a constant output is a measure of the fluidity and viscosity of the polymer melt. Accordingly, the mixtures according to the invention provide for optimal extrusion.

EXAMPLE 4

The melt viscosities of mixtures according to the invention comprising 96% by weight of polymer components $A_2$, $A_3$ and $A_4$ and 4% by weight of copolymer component $B_1$ were compared with those of polymer components $A_2$, $A_3$ and $A_4$. Table 2 below shows that the mixtures according to the invention have considerably lower melt viscosities.

Table 2

| Components | | Melt viscosity (poises) |
|---|---|---|
| $A_2$ | | $150 \cdot 10^3$ |
| Mixture | 96% by weight of $A_2$ / 4% by weight of $B_1$ | $105 \cdot 10^3$ |
| $A_3$ | | $220 \cdot 10^3$ |
| Mixture | 96% by weight of $A_3$ / 4% by weight of $B_1$ | $135 \cdot 10^3$ |
| $A_4$ | | $272 \cdot 10^3$ |
| Mixture | 96% by weight of $A_4$ / 4% by weight of $B_1$ | $180 \cdot 10^3$ |

We claim:

1. A thermoplastic moulding composition with improved flow properties, comprising a mixture of
   (A) 90 to 99.9% by weight of a homopolymer or copolymer with a K-value of from 50 to 80, as measured at a temperature of 25° C. in dimethyl formamide as a 0.5% by weight solution, which contains at least 50% by weight of acrylonitrile or methacrylonitrile or mixtures thereof in polymerised form, and
   (B) 0.1 to 10% by weight of a statistical copolymer of copolymerised units of 65 to 85% by weight of at least one acrylic acid alkyl ester with 1 to 8 carbon atoms in the alcohol component, and 15 to 35% by weight of styrene, copolymer B having an intrinsic vicosity $[\eta]$ of from 2.9 to 13.0 dl/g, as measured at 25° C. in tetrahydrofuran.

2. A thermoplastic moulding composition as claimed in claim 1, wherein polymer A comprises copolymerized units of
   50 to 85% by weight of acrylonitrile, methacrylonitrile or mixtures thereof, and
   15 to 50% by weight of $\alpha$-olefins containing from 3 to 5 carbon atoms, acrylic or methacrylic acid alkyl esters with 1 to 4 carbon atoms in the alcohol component, styrene, vinyl esters of aliphatic saturated $C_2$— or $C_3$—carboxylic acids or mixtures of the above-mentioned monomers.

3. A thermoplastic moulding composition as claimed in claim 1 wherein the mixture comprises (A)

90 to 99.9% by weight of a statistical copolymer of copolymerised units of
50 to 85% by weight of acrylonitrile,
10 to 30% by weight of vinyl acetate, and
5 to 20% by weight of styrene, and (B)

0.1 to 20% by weight of a statistical copolymer of copolymerised units of
70 to 80% by weight of acrylic acid-n-butyl ester, and
20 to 30% by weight of styrene.

4. A thermoplastic moulding composition as claimed in claim 3 wherein the mixture comprises
   (A) 96% by weight of a statistical copolymer of copolymerised units of 64% by weight of acrylonitrile, 22% by weight of vinyl acetate, and 14% by weight of styrene, and
   (B) 4% by weight of a statistical copolymer of copolymerised units of 73% by weight of acrylic acid-n-butyl ester, and 27% by weight of styrene.

* * * * *